(12) United States Patent
Remillard et al.

(10) Patent No.: US 6,690,017 B2
(45) Date of Patent: Feb. 10, 2004

(54) GPS-BASED ANTI-BLINDING SYSTEM FOR ACTIVE NIGHT VISION

(75) Inventors: Jeffrey Thomas Remillard, Ypsilanti, MI (US); Willes H. Weber, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 68 days.

(21) Appl. No.: 09/683,840

(22) Filed: Feb. 21, 2002

(65) Prior Publication Data

US 2003/0155514 A1 Aug. 21, 2003

(51) Int. Cl.[7] .................................................. H04N 5/33
(52) U.S. Cl. ..................................................... 250/341.8
(58) Field of Search ........................................ 250/341.8

(56) References Cited

U.S. PATENT DOCUMENTS

| | | |
|---|---|---|
| 5,210,586 A | 5/1993 | Grage et al. |
| 5,231,401 A | 7/1993 | Kaman et al. |
| 5,457,639 A | 10/1995 | Ulich et al. |
| 5,519,209 A | 5/1996 | Rapoport et al. |
| 5,983,161 A | 11/1999 | Lemelson et al. |
| 6,141,432 A | 10/2000 | Breed et al. |
| 6,236,520 B1 | 5/2001 | Weidel |
| 6,429,429 B1 * | 8/2002 | Fohl et al. .................. 250/353 |
| 2002/0191388 A1 * | 12/2002 | Matveev ...................... 362/31 |

FOREIGN PATENT DOCUMENTS

DE 19644565 A1 * 4/1998 ............ G01V/8/10

* cited by examiner

Primary Examiner—Constantine Hannaher
(74) Attorney, Agent, or Firm—Artz & Artz; Frank A. MacKenzie

(57) ABSTRACT

A night vision system for a vehicle is provided. The system includes an illumination subsystem for illuminating a region proximate the vehicle, a receiver for receiving light reflected off objects in the illuminated region and generating a signal responsive to the received light. A GPS unit is included in operative communication with a GPS network for generating a time signal and vehicle directional data. A controller is programmed to periodically pulse on the illuminating device and the receiver substantially simultaneously as a function of the time signal and the vehicle directional data. In particular, vehicles traveling in opposite directions will have their night vision system activated out-of-phase with each other so that neither night vision system is "blinded" by illumination emitting from the other.

20 Claims, 2 Drawing Sheets

GPS-BASED ANTI-BLINDING SYSTEM FOR ACTIVE NIGHT VISION

BACKGROUND OF INVENTION

1. Technical Field

The present invention relates to a night vision system for detecting objects at relatively low visibility light levels. In particular, the invention concerns an active night vision system having a GPS-based anti-blinding scheme.

2. Background of the Invention

Night vision systems are utilized to allow a user to see objects at relatively low visibility light levels. Night vision systems typically are classified as either passive night vision systems or active night vision systems. In known passive night vision systems used in automotive applications, mid-infrared cameras are used to image objects using the ambient infrared light emitted by the objects in the environment. Mid-infrared night vision systems have relatively few pixels and, accordingly, images formed using such cameras have low video resolution and a relatively narrow field of view. Known active night vision systems utilize a near-infrared (NIR) diode laser or a filtered incandescent light source. The NIR light is subsequently reflected off objects in the environment and is received by a camera. The camera generates a video signal responsive to received light.

An improved active night vision system is disclosed in U.S. Pat. No. 6,429,429 entitled "A Night Vision System Utilizing A Diode Laser Illumination Module And A Method Related Thereto," which is herein incorporated by reference. That application describes an active night vision system that uses a NIR diode laser to illuminate the region forward of the vehicle and a CCD camera to process and display images within the illuminated region. Because NIR light is invisible to the human eye, the laser light can be formed into a high beam pattern to illuminate potential hazards without blinding oncoming vehicle operators. Such systems, however, are susceptible to blinding by oncoming vehicles similarly equipped with a night vision laser illuminator.

Thus, there is a need for a night vision system and method related thereto that mitigates or eliminates blinding of the vehicle night vision system by similarly equipped approaching vehicles.

SUMMARY OF INVENTION

The present invention provides a night vision system and method related thereto for detecting objects at relatively low visibility light levels and mitigating the blinding effects of nearby similarly equipped vehicles. A night vision system in accordance with one embodiment of the present invention includes an illuminating device such as a NIR light source and beam-forming optics for illuminating a region in the forward direction of travel of the vehicle. A receiver, such as a camera, receives light reflected off objects in the illuminated region and generates a video signal responsive to the received light. A global positioning system (GPS) receiver is also included in operative communication with the GPS network for generating an absolute time value and vehicle directional data. The controller periodically pulses on and off the illuminating device and the receiver as a function of the vehicle directional data and the absolute time signal received from the GPS system. Specifically, the controller generates a vehicle-heading-dependent phase delay from the common timing signal to gate on and off the illuminating device and receiver. The phase delay is scaled so that the illumination devices of oppositely traveling vehicles are pulsed 180° out-of-phase with each other. In this way, the system cannot "see" the light source of the other, approaching vehicle.

The present invention is advantageous in that it does not require any means for detecting the light source of an opposing vehicle and reacting thereto. Rather, the commonly available GPS time signal is used to provide a vehicle-directional-dependent phase delay for gating the illuminating device and receiver.

Other advantages and features of the invention will become apparent to one skilled in the art from the following detailed description and the accompanied drawings illustrating features of the invention by way of example.

BRIEF DESCRIPTION OF DRAWINGS

For a more complete understanding of this invention, reference should now be made to the embodiments illustrated in greater detail in the accompanying drawings and described below by way of examples of the invention.

In the drawings.

DETAILED DESCRIPTION

Figure 1:
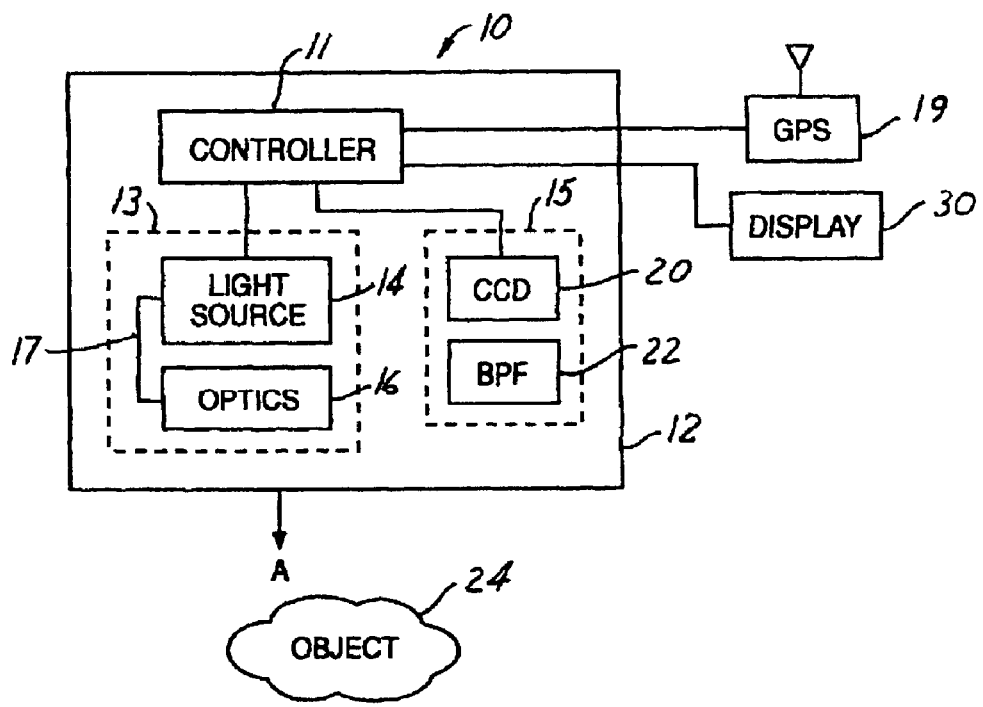
FIG. 1 is a schematic block diagram of a night vision system in accordance with one embodiment of the present invention.

Referring now to the drawings wherein like reference numerals are used to identify identical components in the various views, FIG. 1 illustrates a night vision system 10 for detecting objects at relatively low visibility light levels. The system 10 may be utilized in a plurality of applications. For example, the system 10 may be used in an automotive vehicle to allow a driver to see objects at night that would not be otherwise visible to the naked eye. As illustrated, the system 10 includes a controller 11, an illumination subsystem 13, a receiver 15, and a GPS module 19. Several of the system components may be included within a housing 12. It should be understood, however, that the components of system 10 containing housing 12 could be disposed at different locations within the vehicle wherein the housing 12 would not be needed. For example, the components of the system 10 could be disposed at different operative locations in the automotive vehicle so that a single housing 12 would be unnecessary. Housing 12 is provided to enclose and protect the various components of the system 10. Housing 12 may be constructed from a plurality of materials including metals and plastics.

As will be discussed in more detail below, the system 10 may be used to detect any reflective object, such as object 24, in operative proximity to the system 10.

The controller 11 is preferably a microprocessor-based controller including drive electronics for the illumination subsystem 13 and receiver 15, and image processing logic for the display system 30. Controller 11 may also process signals from GPS module 19 to generate vehicle directional and positional data. Alternatively, GPS module 19 and display unit 30 may include their own respective control logic for generating GPS data and rendering image data, respectively.

The illumination subsystem 13 includes a NIR light source 14, beam-forming optics 16, and a coupler 17 between the two. Many light source and optics arrangements are contemplated by the present invention. For example, in one embodiment, the light source 14 is a NIR diode laser; the beam forming optics 16 are comprised of a thin-sheet optical element followed by a holographic diffuser, whose combined purpose is to form a beam pattern in the direction of arrow A comparable to the high-beam pattern used for normal vehicle headlamps; and the coupler 17 between them is a fiber-optic cable. Such an illumination subsystem is described in U.S. application Ser. No. 09/598,284 entitled "A Night Vision System Utilizing A Diode Laser Illumination Module And A Method Related Thereto" which is incorporated by reference herein. The thin-sheet optical element described therein is preferably constructed from a transparent, solid piece of plastic such as polycarbonate and utilizes the principal of total internal reflection to reflect light. The element 16 may also be constructed from other transparent materials such as acrylics. The emitted light enters the element as collimated light and propagates towards a plurality of reflective facets within the element. A second plurality of reflective facets receive the light reflected from the first plurality of facets and further reflect light through the front surface of the element generally in the direction of arrow A. The holographic diffuser receives infrared light emitted from the thin-sheet optical element and spreads the light over the desired field of view.

The illumination subsystem illuminates the driving environment without blinding drivers in approaching vehicles, since the NIR light is not visible to the human eye. Alternate light sources may comprise a NIR diode laser or light-emitting diode, or any other NIR source that can be switched on and off at frequencies at or exceeding typical video frame rates (30–60 Hz). In another example, the light source 14 is a single stripe diode laser, model number S-81-3000-C-200-H manufactured by Coherent, Inc. of Santa Clara, Calif. Further, the coupler 17 may be a fiber-optic cable, in which case, the NIR light source may be connected to a first end of the fiber-optic cable using a light coupler (not shown) as known by those skilled in the art. A second end of the fiber-optic cable is operatively disposed adjacent to a thin-sheet optical element. Alternatively, the light source could be directly coupled to the thin-sheet optical element through a rigid connector, in which case the coupler would be a simple lens or reflective component. Although the system 10 preferably utilizes an NIR laser light source, an alternate embodiment of system 10 may utilize a conventional light emitting diode NIR source, in lieu of the infrared diode laser.

The receiver 15 includes a NIR-sensitive camera 20 and optical band pass filter 22. The NIR-sensitive camera 20 provides a video signal responsive to reflected infrared light received by the camera 20. The camera 20 may comprise a CCD camera or a CMOS camera. In one embodiment of the system 10, the CCD camera is camera model number STC-H720 manufactured by Sentech Sensor Technologies America, Inc. Infrared light emitted from the illumination subsystem 13 and reflected off the object 24 and the environment is received by the NIR-sensitive camera 20. The video signal is transmitted to the controller 11 or directly to the display module 30 where it is processed and displayed to allow the vehicle operator to see the object 24. The display 30 may be a television monitor, a CRT, LCD, or heads up display positioned within the automotive vehicle to allow the user to see objects illuminated by the system 10.

The optical band pass filter 22 is provided to filter the infrared light reflected from the object 24. In particular, the filter 22 only allows light within the NIR light spectrum to be received by the camera 20. Preferably, the filter 22 allows a maximum transmission of light at a wavelength equal to the wavelength of light generated by the NIR light source 14. An advantage of using the filter 22 is that the filter 22 prevents saturation of the pixel elements (i.e., blooming) in the camera 20 by visible light emitted from the headlamps of other automotive vehicles. The filter 22 is preferably disposed proximate to a receiving lens in the camera 20.

The GPS module 19 is a conventional GPS receiver used to provide vehicle location and directional data as well as timing signals based upon the GPS satellite network. GPS positioning technology is generally available as a public service for precise location and tracking objects located anywhere on the surface of the earth. GPS operates by transmitting precisely timed ranging signals from earth orbiting satellites, which signals are received by ground-based receivers that, in turn, calculate precise global locations using triangulation methods. Calculations are based on measured distances to multiple earth orbiting GPS satellites. GPS makes use of very accurate atomic clocks and precisely known earth orbits for individual satellites to make such precise position calculations. Multi-channel GPS receivers may be used in vehicles to simultaneously track and determine ranges for multiple satellites to enhance real time location calculation times. In the present invention, the vehicle directional data, i.e., north, south, east and west, and the GPS timing signal are used to gate the illumination subsystem 13 and receiver 15 on and off to avoid blinding the receiver 15 with a similar illuminating device on an oncoming vehicle. The vehicle directional data may alternatively be provided by an electronic compass within the vehicle.

Figure 2:
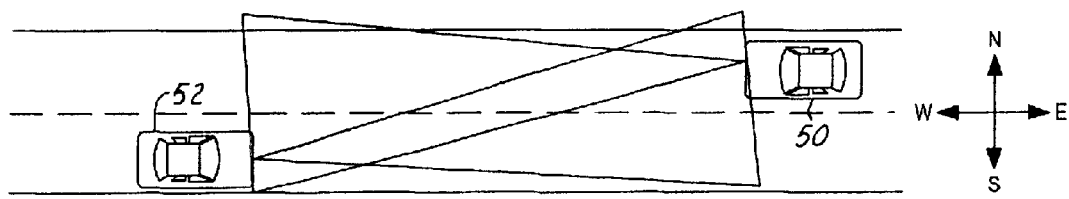
FIG. 2 is a schematic diagram of a vehicle operating environment in which the present invention may be used to advantage.

Referring now to FIG. 2, there is shown a vehicle operating environment wherein the present invention may be used to advantage. In FIG. 2, two vehicles 50, 52 are shown approaching one another from opposite directions. Both vehicles 50, 52 are similarly equipped with a night vision system 10 in accordance with the present invention. From its GPS module, vehicle 50 is aware that it is traveling west and, likewise, vehicle 52 is aware that it is traveling east. If the illumination device of both vehicles 50, 52 were simultaneously turned on, the respective receivers of both vehicles 50, 52 would be saturated or blinded by the opposing vehicle's illumination device. In the present invention, this is avoided by gating the illumination device and receiver of the respective vehicles on and off as a function of the vehicle directional heading.

Figure 3:
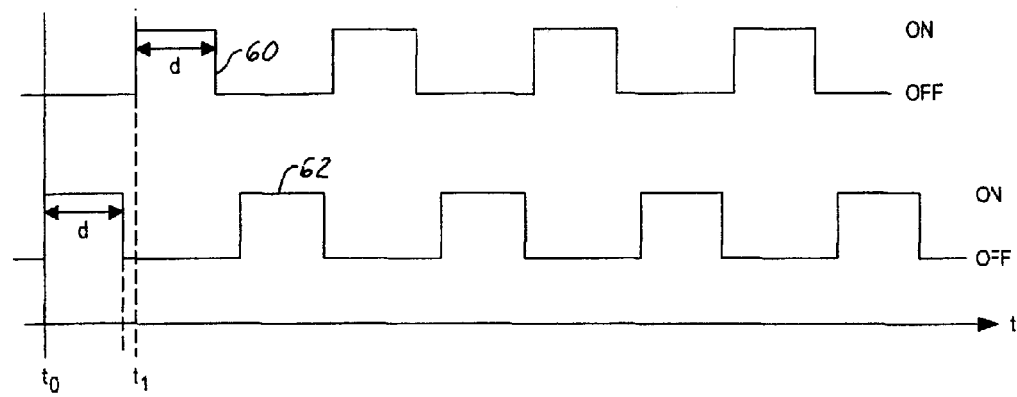
FIG. 3 is a graph showing the timing of the night vision signals for the vehicles of FIG. 2 in accordance with the present invention.

FIG. 3 is a graph of the gated operation of the night vision systems of the vehicles 50, 52 of FIG. 2 in accordance with the present invention. The operation of night vision system of vehicle 50 is shown in line 60 while the operation of the night vision system of vehicle 52 is shown as line 62. As can be seen, the timing of the on pulses for the respective vehicles is out-of-phase by 180°. Thus, the light source of vehicle 50 is on when the light source of vehicle 52 is off and the light source of vehicle 52 is on when the light source of vehicle 50 is off. The gating signals of the respective vehicle night vision systems are sequenced in this fashion based on the commonly received GPS timing signal. In other words, the time-stamp from which the vision system gating occurs is synchronized in vehicles 50, 52 because they both receive the identical time stamp from their respective GPS modules. Thus, at time $t_0$, the light source for vehicle 52 will be gated on for a duration d. At time $t_1$, the light source for vehicle 52 will be off and the light source for vehicle 50 traveling in the western direction will be gated on for a similar duration d.

The duty cycle of each respective vehicle's night vision system can approach 50% without interfering with the other vehicle's reception. Preferably, however, the duty cycle of each vehicle's respective night vision system is less than 50% to ensure that oppositely traveling, similarly equipped vehicles do not interfere with each other's night vision perception. Similarly, vehicles traveling in a northbound direction would have the gate sequence of their night vision system such that it is 180° out-of-phase with the gating sequence of the same night vision system traveling in the southbound direction. The northbound and southbound gating sequence may be the same as the eastbound and westbound gating sequence to maximize the duty cycle of the night vision system, or each respective direction may be assigned a gating sequence corresponding to a 25% duty cycle or less such that the night vision system of a vehicle traveling in any one direction would not be affected by the night vision system of a vehicle traveling in any of the other directions. Of course, the camera system of each vehicle is gated substantially simultaneously such that it detects only light reflected from the light source of the same night vision system.

One advantage of the present invention is that there is no need for vehicle 50 to detect vehicle 52 to mitigate saturation of the night vision system of vehicle 50. Because vehicle 50 is traveling in an opposite direction of vehicle 52, their respective night vision systems will be out-of-phase with each other and camera blinding by the opposing vehicle's night vision system is thereby avoided.

Figure 4:
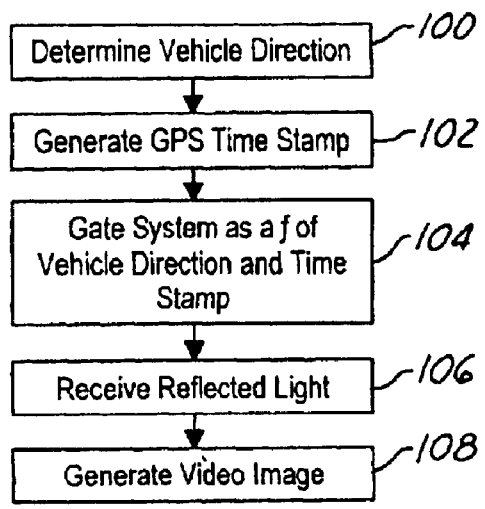
FIG. 4 is a logic flow diagram of one method of operating the night vision system according to the present invention.

Referring now to FIG. 4, there is shown a logic flow diagram of one method of operating the night vision system according to the present invention. The method begins in step 100 by determining the vehicle heading direction. This is generated as a function of the GPS vehicle positioning data or GPS vehicle directional data, or may be determined from a compass provided as part of or separate from the GPS module or night vision system. In step 102, a time-stamp from the GPS module 19 is generated. Since the signal is generated by the GPS satellite network are commonly received by all GPS-equipped vehicles, the timing signal received by all GPS-equipped vehicles is synchronized.

In step 104, the controller 11 gates on and off the illumination device 13 and receiver 15 as a function of the vehicle direction and time-stamp signal. Thus, a vehicle-directional-dependent phase delay from the common timing signal is provided such that similarly equipped vehicles traveling in opposite directions have their respective night vision systems gated out-of-phase with one another as shown in FIG. 3. Thus, for example, night vision systems of vehicles traveling north or west can have a duty cycle of 50% or less and a 0° phase angle with respect to the time-stamp, whereas the night vision system of vehicles traveling south or east can have a 50% duty cycle or less with a phase angle of 180° with respect to the timing signal. In an alternate embodiment, each direction can correspond to a 25% duty cycle or less in 90° increment phase angles. Thus, for example, north may correspond with a phase angle of 0°, east with a phase angle of 90°, south with a phase angle of 180°, and west with a phase angle of 270°. In this way, opposite directions are 180° out-of-phase with each other. Intermediate directions, i.e., northeast, southeast, southwest, and northwest, can be likewise scaled such that opposing points are 180° out-of-phase with each other. Thus, northeast may correspond with a 45° phase angle, whereas southwest may correspond with a phase angle of 225°, and so on.

In step 106, if an object is illuminated by the illumination subsystem 14, the reflected light is received by the camera 20 and processed in step 108 to generate a video image, which can then be displayed to the vehicle operator.

From the foregoing, it can be seen that there has been brought to the art a new and improved vehicle night vision system which has advantages over prior vehicle night vision systems. While the invention has been described in connection with one or more embodiments, it should be understood that the invention is not limited to those embodiments. On the contrary, the invention covers all alternatives, modifications and equivalents as may be included within the spirit and scope of the appended claims.

What is claimed is:

1. A night vision system for a vehicle comprising:
   an illumination subsystem for illuminating a region proximate the vehicle;
   a receiver for receiving light reflected off objects illuminated in said region by said illumination subsystem and generating a signal responsive to said received light;
   a GPS unit in operative communication with a GPS network for generating a time signal and vehicle directional data; and
   a controller programmed to periodically activate said illumination subsystem and said receiver substantially simultaneously as a function of said time signal and said vehicle directional data.

2. A night vision system according to claim 1 wherein said illumination subsystem comprises an infrared light source and beam forming optics receiving light from said light source and reflecting said light generally in a first direction.

3. A night vision system according to claim 2 wherein said infrared light source is a NIR diode laser.

4. A night vision system according to claim 3 further comprising a light coupler for transmitting said light from said infrared light source to said beam forming optics.

5. A night vision system according to claim 4 wherein said beam forming optics comprises a thin-sheet optical element and a holographic diffuser disposed proximate said thin-sheet optical element to diffuse said light being emitted from said thin-sheet optical element.

6. A night vision system according to claim 1 wherein said receiver comprises a NIR-sensitive camera and said signal is a video signal.

7. A night vision system according to claim 6 wherein said receiver further comprises an optical bandpass filter for filtering said light entering said NIR-sensitive camera.

8. A night vision system according to claim 1 further comprising a display adapted to receive said signal and display objects illuminated in said region by said illumination device.

9. A night vision system according to claim 8 wherein said display comprises at least one of a CRT, LCD, or heads-up display.

10. A night vision system for a vehicle comprising:
    a NIR light source;
    a thin-sheet optical element receiving light from said light source and reflecting said light generally in a first direction;
    a NIR-sensitive camera for receiving said light reflected off an object and generating a video signal responsive to said received light;
    a GPS unit in operative communication with a GPS network for generating a time signal and vehicle directional data; and
    a controller programmed to periodically activate said infrared light source and said NIR-sensitive camera substantially simultaneously as a function of said time signal and said vehicle directional data.

11. A night vision system according to claim 10 wherein said infrared light source is a NIR diode laser.

12. A night vision system according to claim 10 further comprising an optical bandpass filter for filtering said light entering said NIR-sensitive camera.

13. A night vision system according to claim 10 further comprising a display adapted to receive said video signal and display an object illuminated by said infrared light source.

14. A night vision system according to claim 13 wherein said display comprises at least one of a CRT, LCD, or heads-up display.

15. A method of detecting objects with a night vision system for a vehicle comprising:
   determining a vehicle directional heading;
   receiving a timing signal from a GPS network;
   periodically transmitting infrared light by activating an infrared light source and a NIR-sensitive camera substantially simultaneously as a function of said vehicle directional heading and said timing signal.

16. A method according to claim 15 further comprising receiving said light reflected off an object and generating a video signal responsive to said received light.

17. A method according to claim 16 further comprising displaying said video signal on a vehicle display.

18. A method according to claim 15 wherein said periodically transmitting comprises operating said infrared light source and said NIR-sensitive camera at a duty cycle of 50% or less and at a phase angle 180° out-of-phase with respect to a duty cycle transmission corresponding to an opposite vehicle directional heading.

19. A method according to claim 15 wherein said periodically transmitting comprises operating said infrared light source and said NIR-sensitive camera at a duty cycle of 50% or less and wherein each vehicle directional heading is associated with operating said duty cycle at a unique phase angle with respect to said timing signal such that opposite vehicle directional headings are 180° out-of-phase with each other.

20. A method according to claim 19 wherein said vehicle directional heading is received from a GPS network.

* * * * *